United States Patent [19]

Sarb

[11] Patent Number: 5,224,293
[45] Date of Patent: Jul. 6, 1993

[54] MEANS AND METHOD FOR GROWING PLANTS INDOORS

[76] Inventor: Kevin J. Sarb, 1044 W. State St., Mason City, Iowa 50401

[21] Appl. No.: 754,009

[22] Filed: Sep. 3, 1991

[51] Int. Cl.⁵ ............................................. A01G 9/02
[52] U.S. Cl. ....................................................... 47/66
[58] Field of Search .................. 47/66, 82, 83, 41.01, 47/41.11

[56] References Cited

U.S. PATENT DOCUMENTS

| | | | |
|---|---|---|---|
| 780,627 | 1/1905 | Umbehend | 47/41.11 |
| 3,401,074 | 9/1908 | Takenouchi | 47/41.01 |
| 4,174,589 | 11/1979 | Daharsh | 47/66 |
| 4,546,571 | 10/1985 | Scrivens | 47/66 |
| 4,899,487 | 2/1990 | Brownlee | 47/82 |
| 5,095,649 | 3/1992 | Brownlee | 47/41.01 |

Primary Examiner—Richard E. Chilcot, Jr.
Assistant Examiner—Michele A. Van Patten
Attorney, Agent, or Firm—Zarley, McKee, Thomte, Voorhees & Sease

[57] ABSTRACT

An improved system for taking care of household plants includes a plant holding basin for holding one or more plans, planters, or plant pots. The plant holding basin has a drain which is fluidly communicated to the indoors or household drainage system. Any water spilled or collected in the plant-holding basin is directed to the indoors or household drainage system. The plant-holding basin is installed near a water providing fixture which can provide water to the plant holding basin. The unit can be installed near a window so that the plants can not only have access to water and drainage, but also to sunlight. The plant-holding basin may or may not be integrated with a conventional sink.

8 Claims, 3 Drawing Sheets

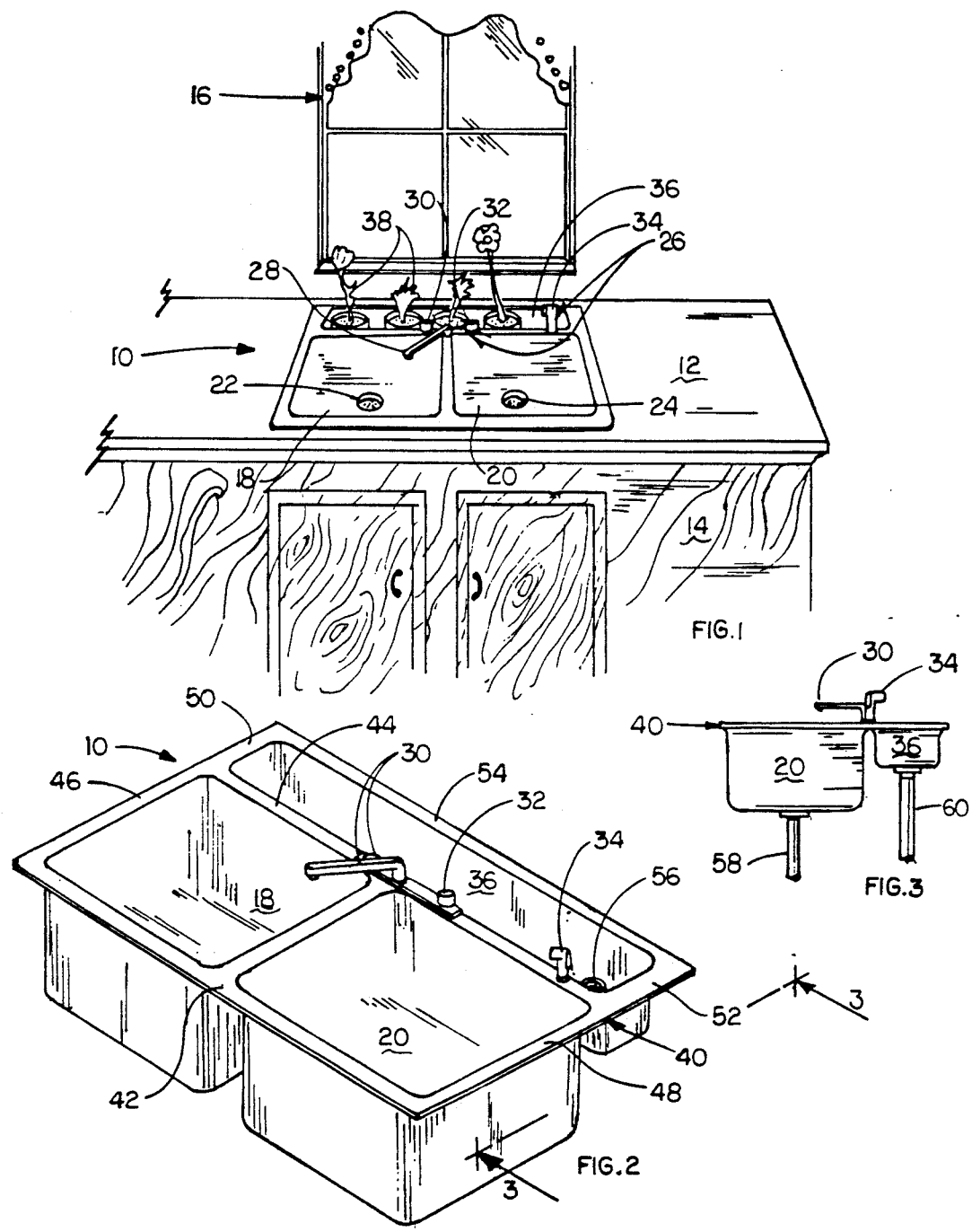

MEANS AND METHOD FOR GROWING PLANTS INDOORS

BACKGROUND OF THE INVENTION

A. Field of the Invention

The present invention relates to the growing of plants indoors, and in particular to a means and method associated with household type sinks such as those used in the kitchens, bathrooms, and other locations to assist with indoor plant growing and care.

B. Problems in the Art

Many persons have or desire to have plants inside their houses. A constant battle exists to provide such plants with appropriate light and water. It is difficult to find an adequate place to position and support plants in planter containers. Generally they need to be near a window.

If plants are placed on window sills, access to the windows can be a problem. A risk also exists that leakage or spillage from watering the plants will adversely affect the window sill. Drainage is also usually important for plant growth. Pots or planters with built in drainage increases the risk of seepage or spillage of water onto the sill.

Additionally, many window sills are not big enough to accommodate even the smaller planter containers or plants. Furthermore, it may not be appropriate or feasible to place them on the sill even if they fit. Some windows simply have no sill at all that could support even a several-inches-in-diameter planter or pot.

It is usually desirable to make it as convenient as possible to water indoor plants. The nearer to the water source the plants are, the better. Normally, watering requires filling a watering can or pot at a sink and carrying it to the plants. Otherwise, the plants can be carried to the sink. The former procedure for watering requires substantial manual work as well as the risk of spillage or leakage between the sink and the plants. The latter method requires the manual work of carrying the plants to the sink which again involves some risk of spilling.

There is no effective way to solve these difficulties and problems. The best system would provide indoor plants not only ready access to light (normally through a window) and ready access to water, but also access to virtually unlimited drainage with small risk of spillage and leakage, and potential resulting damage to furniture or window sills.

If plants or their containers were placed in conventional household sinks they would have access to water and drainage. It would preclude conventional use of the sink however.

Some sophisticated sinks can include two side by side basins, different shapes and sizes of the basins or more sophisticated fixtures such as an added sprayer hose or a second faucet. Some sinks even have a relatively smaller and shallower second basin for use to wash vegetables, fruits, or over which can be placed a cutting board, where the scraps on the cutting board can be conveniently moved to the sink.

While sizes, shapes, and configurations of present day household sinks are diverse, they all are related to conventional sink functions. In other words, they are used for washing things, such as dishes, clothes, hands, or food. A two basin sink generally extends from the front of the counter to the rear of the counter and allows selection between two sink basins, each with a separate drain. One perhaps can be hooked up to a garbage disposer unit. Sinks with multiple fixtures or fixture options are designed to enhance the use of the sink for cooking, washing, or other conventional sink purposes. Even sinks having unique and differently configured basins are most times directly related to making food preparation easier. All portions of the sink must be readily accessible and available to the user, and therefore, must be accessible unimpeded from the front of the sink, and generally must be reachable by at least some faucet of the sink fixtures.

It is therefore a primary object of the present invention to provide a means and method for growing plants indoors which solves the problems and deficiencies in the art.

Another object of the present invention is to provide a means and method as above described which provides immediate access to water.

A still further object of the present invention is a means and method as above described which can provide not only immediate access to water, but virtually unlimited drainage.

Another object of the present invention is to provide a means and method as above described which can combine immediate access to water with placement at or near a window for light for the plants.

Another object of the present invention is to provide a means and method as above described which greatly reduces problems associated with spillage or leakage from house plants.

A still further object of the present invention is to provide a means and method as above described which provides easy access to care of house plants.

These and other objects, features, and advantages of the present invention will become more apparent with reference to the accompanying specification and claims.

SUMMARY OF THE INVENTION

The present invention presents an improved way to raise house plants. A plant basin is configured to hold one or more plants or plant containers. The plant basin includes a drain, which is in fluid communication with the household drainage system. Any surplus water from the plant basin or from the plant containers into the plant basin can therefore be handled. The plant basin not only supports the plants or plant containers but encloses them to reduce risk of spillage or leakage onto window sills, counters, or furniture. The plant basin is generally in close association with a household sink and shares the water source with the sink to provide close, easy, quick access to water, while reducing risk of spillage. The plant basin is also generally positioned to gain the best advantage of available light, and also allow easy access to the plants without significant interference with access or operation of the household sink.

The invention would be particularly valuable where the household sink, or the household drain and water service, is directly adjacent to a window or where the window sill does not support or would not be a desirous place for plants. However, the invention is advantageous for any situation where plants are to be kept indoors. The exact configuration of the invention can take on many different embodiments, as will be discussed further.

BRIEF DESCRIPTION OF THE DRAWINGS

FIG. 1 is perspective view of an embodiment of the invention integrated with a household sink and installed in a kitchen counter.

FIG. 2 is an isolated perspective view of the invention of FIG. 1.

FIG. 3 is a side elevational view taken along line 3—3 of FIG. 2.

DETAILED DESCRIPTION OF THE PREFERRED EMBODIMENT

Figures 4, 5, 6, 7:
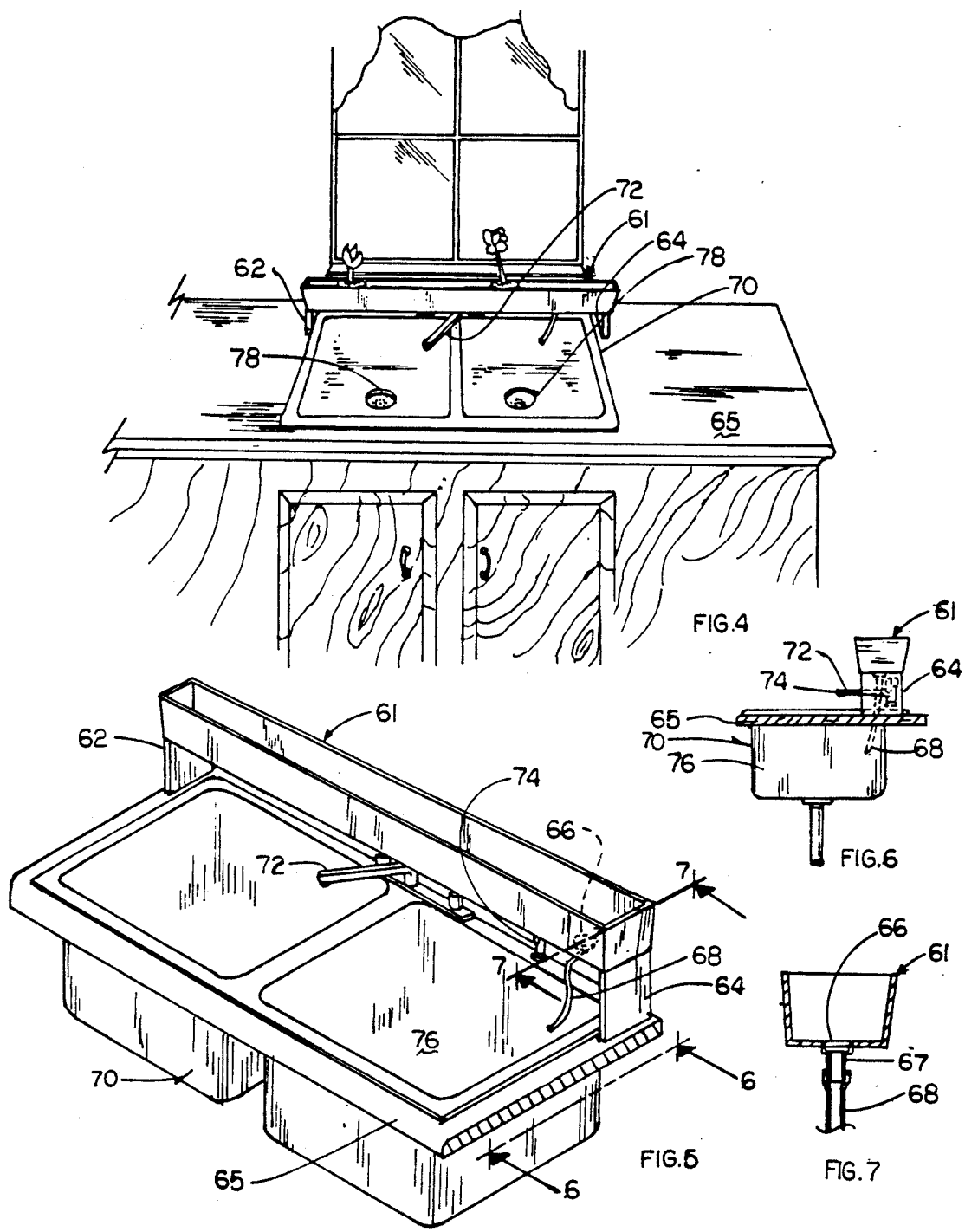
FIG. 4 is a perspective view of another embodiment of the invention in association with a household sink installed in a counter.
FIG. 5 is an isolated perspective view of the invention in association with the household sink and counter.
FIG. 6 is a sectional view taken along line 6—6 of FIG. 5.
FIG. 7 is a sectional view taken along line 7—7 of FIG. 5.

In order to assist in providing a better understanding of the invention, a preferred embodiment will now be described in detail. The embodiment will actually be described in two versions. It is emphasized that these versions of the preferred embodiment do not limit, nor are they intended to limit, the scope of the invention. This description merely illustrates an example of the form the invention could take.

To assist in this description, reference will be taken to the drawings FIGS. 1-7. Reference numerals will be utilized to indicate specific parts and locations in the drawings. The same reference numerals will be used to indicate the same parts and locations throughout all the drawings, unless otherwise noted.

The first version of the preferred embodiment is shown at FIGS. 1-3. FIG. 1 shows a sink 10 installed in a counter 12 for a kitchen cabinet 14. A window 16 exists directly behind sink 10.

As can be seen in FIG. 1, sink 10 has two side by side sink basins 18 and 20, each having a drain 22 and 24. A fixture 26, including faucet 28, hot and cold water controls 30 and 32, and sprayer head and hose 34, are positioned in front of a back basin 36 which holds plants and planters 38.

FIG. 1 shows that basins 18 and 20, as well as fixture 26 are essentially conventional in form and configuration. Basins 18 and 20 are large enough for conventional kitchen uses. Faucet 28 and sprayer 34 are functional with both basins 18 and 20. Control knobs 30 and 32, as well as basins 18 and 20, are directly accessible by a user's hands.

In addition, however, sink 10 according to the invention includes the back basin 36 which extends across the back of sink 10, as well as across the width of window 16. A variety of planters 38 can be placed within back basin 36 directly beneath window 16. Additionally, sprayer 34, which is extendable by a hose (not shown), as is well known, quickly and easily can be used to provide water to planters 38.

The specific structure of embodiment 10 is shown in more detail in FIGS. 2 and 3. A top plate or flange 40 provides the frame or support for basins 18, 20, and 36. Basins 18 and 20 are framed by front, back, and side portions 42, 44, 46, and 48 of top plate 40. Back basin 36 is framed by a combination of back portion 44, opposite side portions 50 and 52, and portion 54. Portions 50, 52, and 54 are basically extensions from the other portions. It is noted that apertures through which fixture 26 can be installed on top plate 40 exist along back portion 44. This positions the fixture 26 in between basins 18, 20, and basin 36.

FIG. 2 shows that back basin 36 also has an individual drain 56. By referring to FIG. 3, it can be seen that in this preferred embodiment, back basin 36 is substantially shallower and substantially narrower than basins 18 and 20. However, FIG. 2 shows that it extends across the entire width of sink 10.

This configuration allows standard type small planters or pots 38, being several inches in diameter and several inches tall, to be easily placed and supported in back basin 36. Many planters 38 are configured to allow excess water to drain. Therefore, sink 10 allows these planters 38 to be used without any additional containers to catch any drained-off water. As previously mentioned, back basin 36 would also catch any spillage when watering with sprayer 34, or a hand-held waterer.

FIG. 3 also shows how drain pipes 58 and 60 are connected to respective basins 20 and 36. The exact manner of connection and configuration of such pipes is within the skill of those of ordinary skill of the art and is not germane to the invention. It is pointed out, however, that sink 10 is configured to fit within standard size counters 12 and cabinets 14, and to allow easy connection of plumbing such as drain pipes 58 and 60. The plumbing to fixture 26 or basin 18 is not shown, but also would easily be accommodated by sink 10.

It is to be understood that basins 18 and 20 could be substituted by a single basin. Sink 10 could be utilized in a bathroom, or virtually any place that a conventional sink could be utilized. The relative dimensions of length, width, and depth of back basin 36 can vary. For example, it may be that it is desired that back basin 36 extend only half way across the back of basins 18 and 20. Moreover, it might be configured so that it is the same depth as basins 18 or 20. Moreover, it could be positioned so that all or part of it is aligned along the side of basin 18 or 20, rather than across the back. Moreover, it could be of shapes other than elongated. Still further, it is possible that back basin 36 could be a separate component from basins 18 and 20 and top plate 40. The components would be interconnected, generally however, by a drainage system.

Additionally, it is not required that drain 56, as shown in the drawings, be utilized. Other types of drainage systems are possible. Still further, it is possible that a component other than sprayer 34 be utilized to provide water to back basin 36. Other options, features, and enhancements are possible.

FIGS. 4-7 illustrate the second version of the preferred embodiment. It functions essentially the same as the version in FIGS. 1-3 except for the following differences.

The plant basin 61 is not integral with the sink, but rather is positioned on legs 62 and 64 which can sit on a counter 65 and over the rear portion of the conventional two-basin sink 70 with conventional fixtures (for example, faucet 72 and hand-held extendable sprayer 74). Basin 61 is water tight and can be made out of any number of materials including stainless steel, porcelain, or plastic. Drain 66 exists in the bottom of basin 61. A hose 68 connected to drain 66 directs drainage to a basin 76 of the conventional sink 70 where the drainage can then drain out of the drain 78 of that conventional sink.

FIG. 6 shows an elevational side view of the relationship of basin 61 and sink 70. Sprayer 74 can be gripped and maneuvered to water plants in basin 61. Basin 61 is elevated and therefore elevates the plants with respect to the window. Basin 61 would be configured to cause water to flow to drain 66 by gravity. This could be accomplished by sloping the bottom of basin 61 by the configuration of the basin 61 or by varying the height of legs 62, 64. Alternatively drain 66 could be placed anywhere in the floor of basin 61 and drainage flow created in ways created in conventional sinks or such as is well within the skill of those of ordinary skill in the art.

FIG. 7 shows in cross-section drain 66 and hose 68. This connection can be made by a hollow nipple 67 formed to or around drain 66 to which hose 68 can be stretched over and secured. A securing bracket (not shown might be used to secure hose 68 to nipple 67. Other connection structure and methods are possible. The overall shape, size, and configuration of this version can vary.

Figure 8:
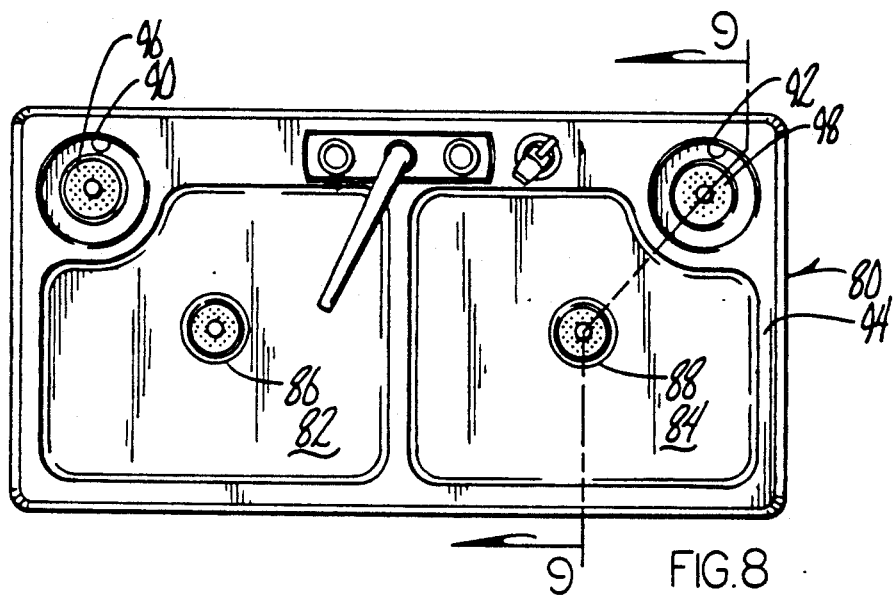
FIG. 8 is a top plan view of another embodiment of the invention.

FIG. 8 depicts a further example of the different forms and embodiments the invention can take. This top plan view illustrates a sink 80 similar to sink 10 of FIG. 1. It has side-by-side basins 82 and 84, each basin 82 and 84 having a drain 86 and 88 respectively connected to the household drain system. FIG. 8 differs from FIG. 1 in that plant-holding basins 90 and 92 are small, circular-shaped basins formed in opposite rear corners of sink 80. The top plate 94 from which all basins 82, 84, 90 and 92 are supported (and extend downwardly from) is generally rectangular. The entire sink 10 thus fits in a counter opening for a regular-sized sink. Basins 90 and 92 can, for example, each hold one plant pot or container, and each basin 90 and 92 has a drain 96 and 98 respectively, which are in fluid communication with the household drainage system. The faucet, water controls, and hand-held sprayer are conventional.

Figure 9:
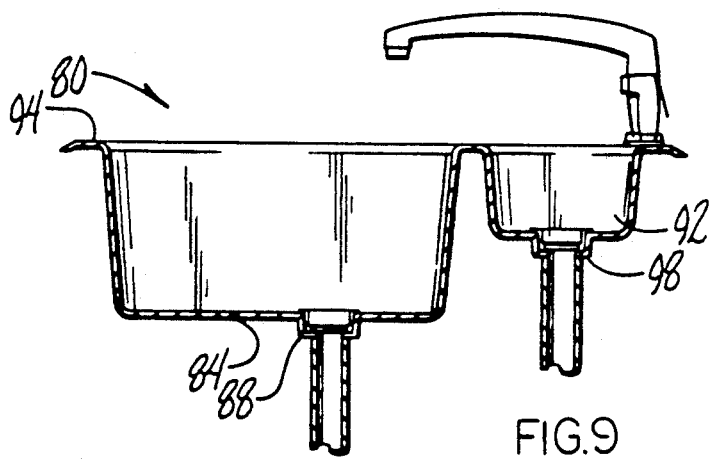
FIG. 9 is a sectional view taken along line 9—9 of FIG. 8.

FIG. 9 depicts a sectional view the embodiment of FIG. 8.

It can therefore be seen how the versions of the invention accomplish at least all the stated objectives of the invention. It will be appreciated, however, that the present invention can take many forms and embodiments. The true essence and spirit of this invention are defined in the appended claims, and it is not intended that the embodiment of the invention presented herein should limit the scope thereof.

What is claimed is:

1. A means of indoor care of plants in a sink facility that has a drainage system comprising:
  a plant-holding basin means for at least partially containing and supporting at least one plant wherein the plant-holding basin means holds at least one container each containing one or more plants and soil;
  a drain means associated with the plant-holding basin means for providing drainage from the plant-holding basin means; and
  fluid conduit means for fluidly communicating the drain means of the plant-holding basin means and the drainage system of a sink facility.

2. The means for claim 1 wherein the facility includes a water source and a water delivery means which is manually positionable with respect to the plant-holding basin to provide water to one or more plants in the plant-holding basin.

3. The means of claim 1 wherein the plant-holding basin has an upper edge defining a top opening, sidewalls extending downwardly from the upper edge, and a floor.

4. The means of claim 3 wherein the plant-holding basin is integrally formed with a sink means having a drain pipe.

5. The means of claim 4 wherein the fluid conduit means of the plant holding basin is fluidly connected to the drain pipe of the sink means.

6. The means of claim 3 wherein the plant-holding basin includes legs on opposite sides to elevate the floor of the plant-holding basin.

7. The means of claim 6 wherein the drain means comprises an aperture in the floor and a tube means sealingly connected around the aperture and extending downwardly.

8. The means of claim 7 further comprising a sink means having a sink drain, the tube means being in fluid communication with the sink drain.

* * * * *